(12) United States Patent
Kamura et al.

(10) Patent No.: US 9,529,117 B2
(45) Date of Patent: Dec. 27, 2016

(54) POLYMERIZABLE COMPOSITION FOR OPTICAL MATERIAL, METHOD FOR PRODUCING SAME, AND METHOD FOR PRODUCING OPTICAL MATERIAL

(71) Applicant: MITSUBISHI GAS CHEMICAL COMPANY, INC., Tokyo (JP)

(72) Inventors: Teruo Kamura, Chiba (JP); Naotsugu Shimoda, Tokyo (JP); Yoshihiko Nishimori, Chiba (JP); Eiji Koshiishi, Chiba (JP); Motoharu Takeuchi, Ibaraki (JP)

(73) Assignee: MITSUBISHI GAS CHEMICAL COMPANY, INC., Toyko (JP)

( * ) Notice: Subject to any disclaimer, the term of this patent is extended or adjusted under 35 U.S.C. 154(b) by 0 days.

(21) Appl. No.: 14/373,718

(22) PCT Filed: Feb. 13, 2013

(86) PCT No.: PCT/JP2013/053306
§ 371 (c)(1),
(2) Date: Jul. 22, 2014

(87) PCT Pub. No.: WO2013/122068
PCT Pub. Date: Aug. 22, 2013

(65) Prior Publication Data
US 2014/0357835 A1 Dec. 4, 2014

(30) Foreign Application Priority Data

Feb. 14, 2012 (JP) .................................. 2012-029700
Sep. 4, 2012 (JP) .................................. 2012-193832
Sep. 4, 2012 (JP) .................................. 2012-193833

(51) Int. Cl.
C08G 75/32 (2006.01)
G02B 1/04 (2006.01)
C08G 75/08 (2006.01)

(52) U.S. Cl.
CPC ............... *G02B 1/041* (2013.01); *C08G 75/08* (2013.01); *G02B 1/04* (2013.01)

(58) Field of Classification Search
CPC ............. C08G 75/08; G02B 1/04; C08L 81/00
USPC ........................................................ 528/375
See application file for complete search history.

(56) References Cited

U.S. PATENT DOCUMENTS

| | | | |
|---|---|---|---|
| 5,374,668 A | 12/1994 | Kanemura et al. | |
| 6,201,061 B1 | 3/2001 | Amagai et al. | |
| 6,531,532 B1 | 3/2003 | Yoshimura et al. | |
| 2002/0022713 A1 | 2/2002 | Tanaka et al. | |
| 2009/0018308 A1 | 1/2009 | Kamura et al. | |
| 2009/0156781 A1 | 6/2009 | Ihara et al. | |
| 2010/0137555 A1 | 6/2010 | Itoh et al. | |
| 2012/0010361 A1* | 1/2012 | Urakawa .................. | C08F 2/44 524/730 |
| 2013/0068299 A1* | 3/2013 | Okaniwa et al. ............. | 136/257 |
| 2015/0011727 A1 | 1/2015 | Koshiishi et al. | |

FOREIGN PATENT DOCUMENTS

| | | |
|---|---|---|
| EP | 1882713 A | 5/2006 |
| JP | 11-335560 | 12/1999 |
| JP | 2001-002783 | 1/2001 |
| JP | 2001-342252 | 12/2001 |
| JP | 2003-001643 | 1/2003 |
| JP | 2004-197005 | 7/2004 |
| JP | 2004-269673 | 9/2004 |
| JP | 2006-348285 | 12/2006 |
| JP | 2006-348286 | 12/2006 |
| JP | 2006-348289 | 12/2006 |
| JP | 2009-144094 | 7/2009 |
| JP | 2010-043181 | 2/2010 |
| JP | 2010-053279 | 3/2010 |
| WO | 89/10575 | 11/1989 |
| WO | 2008/136401 | 11/2008 |
| WO | 2012/147708 | 11/2012 |
| WO | 2013/129460 | 9/2013 |

OTHER PUBLICATIONS

Search report from Internationl Search Report in PCT/JP2013/053306, mailed May 7, 2013., mail date is.
European Search Report issued with respect to application No. 13749331.8, mail date is Oct. 28, 2015.

* cited by examiner

Primary Examiner — Shane Fang
(74) Attorney, Agent, or Firm — Greenblum & Bernstein, P.L.C.

(57) ABSTRACT

By using a method for producing a composition for an optical material using (a) sulfur, (b) a compound having two intramolecular episulfide groups, (c) a compound having one or more (preferably two) SH groups, and (d) an amine compound having a specific structure, in which compound (a) and compound (c) are pre-polymerized in the presence of compound (b) using compound (d) as the pre-polymerization catalyst, the present invention provides a polymerizable composition for an optical material in which the viscosity elevation speed during pre-polymerization is slow and the reaction temperature is approximately room temperature, and that has a low viscosity and shows little increase in viscosity. By means of another embodiment of the present invention, it is possible to produce an optical material that has excellent mold release characteristics but has substantially no striae by polymerizing (a) sulfur, (b) a compound having two intramolecular episulfide groups, and (c) a compound having one or more SH groups in the presence of (d) a hindered amine catalyst having a specific structure.

9 Claims, No Drawings

POLYMERIZABLE COMPOSITION FOR OPTICAL MATERIAL, METHOD FOR PRODUCING SAME, AND METHOD FOR PRODUCING OPTICAL MATERIAL

TECHNICAL FIELD

The present invention relates to an optical component for a plastic lens, a prism, an optical fiber, an information recording substrate, a filter, an adhesive or the like, in particular an optical lens such as plastic lenses for eyeglasses. The present invention further relates to an optical material which has excellent mold release characteristics and has substantially no striae and a method for producing the same, wherein a polymerizable composition, which comprises: a preliminary reaction solution obtained by subjecting sulfur, a compound having two intramolecular episulfide groups and a compound having one or more intramolecular SH groups to a prepolymerization reaction using a hindered amine having a specific structure as a prepolymerization catalyst; and a polymerization catalyst, is polymerized and cured. The present invention further relates to a method for producing a composition for optical materials having high productivity and low viscosity, and an optical material (optical resin material) for a plastic lens, a prism, an optical fiber, an information recording substrate, a filter or the like using the same.

BACKGROUND ART

Plastic materials are lightweight, highly tough and easy to be dyed, and therefore are widely used recently for various types of optical materials, particularly eyeglass lenses. Optical materials, particularly eyeglass lenses, are specifically required to have, as main properties, low specific gravity, high transparency and low yellowness, and as optical properties, high refractive index and high Abbe number. Recently, a polymerizable composition for optical materials, in which an inorganic compound having a sulfur atom and/or a selenium atom is blended with a polyepisulfide compound for the purpose of achieving a high refractive index and a high Abbe number, has been proposed (e.g., Patent Document 1).

Though a high refractive index can be achieved by an optical material obtained by polymerizing and curing such a composition, in many cases, an inorganic compound having a sulfur atom and/or a selenium atom is solid at ordinary temperature and has a low solubility, and therefore, there are problems in that precipitation may occur when providing a composition and the compound may be dissolved insufficiently when the concentration thereof is high.

For this reason, a technique in which an inorganic compound having a sulfur atom and/or a selenium atom and a sulfur-containing organic compound such as a polyepisulfide compound that can react with the inorganic compound are subjected to a prepolymerization reaction in advance has been proposed (see Patent Document 2). However, when the content of the inorganic compound having a sulfur atom and/or a selenium atom is increased, the viscosity of a polymerizable composition becomes too high, and it becomes difficult to carry out usual injection and polymerization operations such as filtration and mold injection. Therefore, for the purpose of reducing the viscosity at the time of the prepolymerization reaction, the addition of a compound having one SH group (see Patent Document 3), a compound having one or more NH groups and/or $NH_2$ groups (see Patent Document 4) or a compound having one or more disulfide bonds (see Patent Document 5) has been proposed. However, in the case of a composition in which the content of an inorganic compound having a sulfur atom and/or a selenium atom is 10 parts by mass or more, even when an additive for reducing the viscosity of the composition is added, the viscosity may be increased, for example, in the case where a prepolymerization reaction is performed excessively and/or the temperature after the preparation of the composition is too high, or the viscosity after about 3 hours, which is the injection time usually required for producing an optical material industrially, may be significantly increased. As a result, it becomes difficult to carry out usual injection operations such as filtration and mold injection, and there are problems in that increasing in size of apparatuses for filtration and injection and shortening of the injection line are required. Moreover, for the purpose of improving the productivity of optical materials, a polymerizable composition for optical materials having a lower viscosity, which makes it easier to carry out filtration and injection operations, has been desired.

Further, since the prepolymerization reaction of the aforementioned reference is usually performed at 50° C. to 70° C., it is necessary to cool the composition to about room temperature which is the temperature of initiation of polymerization after mold injection, and the cooling step is required after the completion of the prepolymerization reaction. For increasing a reaction scale, unless increasing in size of a cooling apparatus, introduction of a cooling coil into a reaction apparatus, etc. are carried out, the time required for cooling increases or changes in each case. This is also the problem. For this reason, a method for producing a polymerizable composition for optical materials which can be subjected to a prepolymerization reaction at a reaction temperature near room temperature is desired.

In Patent Documents 1 and 2, an optical material having a high refractive index can be obtained, but mold release characteristics at the time of releasing it from a mold after polymerization and curing may be poor. In the case of optical materials having a complicated shape, in particular, an optical lens, the smaller the radius of curvature of the lens is, the poorer the mold release characteristics tend to be, and it is extremely difficult to improve mold release characteristics of minus-power lenses of −15.0 D or more. In the case of poor mold release characteristics, the production time may be increased, a defect of an optical material and/or a mold may be generated, and it may become impossible to use the optical material and/or the mold. Thus, the production may be affected thereby. In order to improve mold release characteristics of optical materials, a mold release agent is generally used, and external mold release agents, which are applied to a mold and used, and/or internal mold release agents, which are added to a monomer and used, are known (see Patent Document 6).

However, the method of applying a mold release agent to a mold is very complicated, and there are problems in that the surface of an optical material becomes rough due to an external mold release agent and turbidity is generated in an optical material. Further, also in the case of internal mold release agents, there are problems in that the addition of just a small amount of an internal mold release agent generates turbidity in an optical material and a prepolymerization reaction and/or polymerization reaction rate are affected thereby to generate many striae in the optical material. Therefore, an optical material which has good mold release characteristics and has substantially no striae without the above-described influences and a method for producing the same have been desired.

Further, the prepolymerization reaction of Patent Documents 1 and 2 is usually performed at 50° C. to 70° C., and it is necessary to cool the composition to about room temperature which is the temperature of initiation of polymerization after mold injection. However, since the preliminary reaction temperature is high, there is a problem in that the viscosity of the polymerizable composition is elevated by the progress of side reaction, significant reduction in the temperature due to cooling or the like. When the temperature after cooling is set at a high temperature in order to suppress the viscosity elevation, there are problems in that the pot life is shortened and striae are generated due to the difference between the temperature after cooling and the temperature of holding at an early stage of the polymerization step. Therefore, a production method in which a polymerizable composition for optical materials comprising a sulfur-containing organic compound such as a polyepisulfide compound and an inorganic compound having a sulfur atom and/or a selenium atom can be subjected to a prepolymerization reaction at a reaction temperature near room temperature has been desired.

PRIOR ART DOCUMENTS

Patent Documents

Patent Document 1: Japanese Laid-Open Patent Publication No. 2001-2783
Patent Document 2: Japanese Laid-Open Patent Publication No. 2004-197005
Patent Document 3: Japanese Laid-Open Patent Publication No. 2006-348285
Patent Document 4: Japanese Laid-Open Patent Publication No. 2006-348289
Patent Document 5: Japanese Laid-Open Patent Publication No. 2006-348286
Patent Document 6: International Publication WO89/10575 pamphlet

SUMMARY OF THE INVENTION

Problems to be Solved by the Invention

The problems to be solved by the present invention are to make it easy to control the end point of a prepolymerization reaction at the time of producing a polymerizable composition for optical materials using sulfur, a compound having two intramolecular episulfide groups and a compound having one or more (preferably two) SH groups, and to reduce the time required for cooling by adjusting the reaction temperature to approximately room temperature. In addition, another problem is to develop a polymerizable composition for optical materials having a low viscosity, which is easily subjected to filtration and the injection operation, in order to improve the productivity of optical materials.

Moreover, the problem to be solved by the present invention is the improvement of mold release characteristics and the reduction of striae in an optical material having a high refractive index obtained by polymerizing and curing a polymerizable composition, comprising: a preliminary reaction solution obtained by a prepolymerization reaction of sulfur, a compound having two intramolecular episulfide groups and a compound having one or more intramolecular SH groups; and a polymerization catalyst.

Striae as used herein refer to cotton-like or layered portions of a material component having a refractive index different from that of the base material in an optical material, and such striae are generated, for example, by slight sparsity/density in the optical material caused by convection of a polymerizable composition caused by heat generation during polymerization and curing, and uneven progress of a polymerization reaction. Therefore, in the case of optical lenses, the larger the minus power is, the larger the thickness of the peripheral portion of the optical lens is, and this often causes striae. For this reason, it is difficult to reduce striae of optical lenses with more than −12.5 D, and moreover, it is extremely difficult to reduce striae of optical lenses with more than −15.0 D.

Furthermore, the problem to be solved by the present invention is to provide a method for producing a polymerizable composition for optical materials having good productivity, which enables suppression of viscosity elevation due to a side reaction of the prepolymerization reaction or excessive reaction progress without the generation of striae at the time of producing the polymerizable composition for optical materials using sulfur, a compound having intramolecular episulfide groups and a compound having intramolecular SH groups.

Means for Solving the Problems

The present inventors diligently made researches to solve the problems and found that at least one of the above-described problems can be solved by the present invention described below. Specifically, the present invention is as follows:
<1> A polymerizable composition for optical materials, which comprises: a preliminary reaction solution obtained by subjecting 10 to 50 parts by mass of the below-described compound (a) and 1 to 20 parts by mass of the below-described compound (c) to a prepolymerization reaction in the presence of 50 to 90 parts by mass of the below-described compound (b) (with the proviso that the total amount of the compound (a) and the compound (b) is 100 parts by mass), using 0.001 to 10 parts by mass (the upper limit is preferably 5 parts by mass or less, and more preferably 3 parts by mass or less) of the below-described compound (d) as a prepolymerization catalyst; and a polymerization catalyst:
(a) sulfur (the compound (a));
(b) a compound having two intramolecular episulfide groups represented by the following formula (1) (the compound (b)):

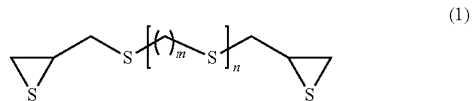

wherein m represents an integer from 0 to 4, and n represents an integer from 0 to 1;
(c) a compound having one or more (preferably two) SH groups (the compound (c));
(d) a compound represented by the following formula (2) (the compound (d)):

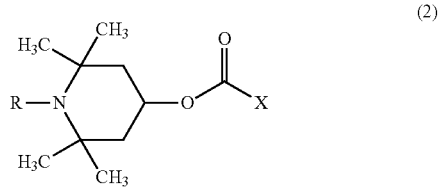

wherein R represents an alkyl group having 1 to 4 carbon atoms, and X represents an organic group having 2 to 11 carbon atoms, which has any of a vinyl group, a vinylidene group and a vinylene group.

<2> A method for producing a polymerizable composition for optical materials, which comprises adding a polymerization catalyst to a preliminary reaction solution obtained by subjecting 10 to 50 parts by mass of the below-described compound (a) and 1 to 20 parts by mass of the below-described compound (c) to a prepolymerization reaction in the presence of 50 to 90 parts by mass of the below-described compound (b) (with the proviso that the total amount of the compound (a) and the compound (b) is 100 parts by mass), using 0.001 to 10 parts by mass (the upper limit is preferably 5 parts by mass or less, and more preferably 3 parts by mass or less) of the below-described compound (d) as a prepolymerization catalyst:

(a) sulfur (the compound (a));
(b) a compound having two intramolecular episulfide groups represented by the following formula (1) (the compound (b)):

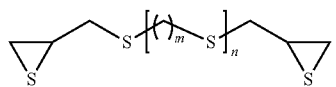

(1)

wherein m represents an integer from 0 to 4, and n represents an integer from 0 to 1;
(c) a compound having one or more (preferably two) SH groups (the compound (c));
(d) a compound represented by the following formula (2) (the compound (d)):

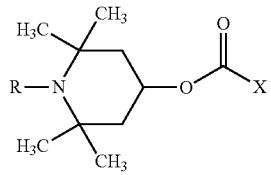

(2)

wherein R represents an alkyl group having 1 to 4 carbon atoms, and X represents an organic group having 2 to 11 carbon atoms, which has any of a vinyl group, a vinylidene group and a vinylene group.

<3> The polymerizable composition for optical materials according to <1> above, wherein the polymerizable composition for optical materials is obtained by further adding the polymerization catalyst and the compound (c) to the preliminary reaction solution.

<4> A method for producing an optical material, which comprises polymerizing and curing the polymerizable composition for optical materials according to <1> above.

<5> An optical material obtained by the production method according to <4> above.

<6> An optical lens comprising the optical material according to <5> above.

<7> A method for producing a polymerizable composition for optical materials, which comprises the steps of:
subjecting 10 to 50 parts by mass of the below-described compound (a) and 1 to 20 parts by mass of the below-described compound (c) to a prepolymerization reaction at a reaction temperature T1 (wherein T1 is 0 to 45° C.) in the presence of 50 to 90 parts by mass of the below-described compound (b) (with the proviso that the total amount of the compound (a) and the compound (b) is 100 parts by mass), using 0.001 to 5 parts by mass of the below-described compound (d) as a prepolymerization catalyst, to obtain a preliminary reaction solution; and adding a polymerization catalyst to the preliminary reaction solution with the temperature being set at T2 (with the proviso that T2 is T1−15° C. to T1+10° C. and 0 to 45° C.):
(a) sulfur (the compound (a));
(b) a compound having two intramolecular episulfide groups represented by the following formula (1) (the compound (b)):

(1)

wherein m represents an integer from 0 to 4, and n represents an integer from 0 to 1;
(c) a compound having one or more (preferably two) SH groups (the compound (c));
(d) a compound represented by the following formula (2) (the compound (d)):

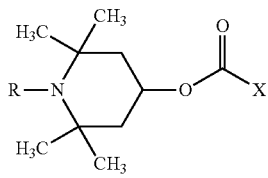

(2)

wherein R represents an alkyl group having 1 to 4 carbon atoms, and X represents an organic group having 2 to 11 carbon atoms, which has any of a vinyl group, a vinylidene group and a vinylene group.

<8> A method for producing an optical material, which comprises polymerizing the polymerizable composition for optical materials produced by the production method according to <7> above with the initial temperature of the polymerization being set at T3 (with the proviso that T3 is T2−10° C. to T2+10° C. and 0 to 40° C.).

<9> An optical material produced by the method according to <8> above.

Advantageous Effect of the Invention

According to the present invention, in a prepolymerization reaction at the time of producing a polymerizable composition for optical materials using sulfur, a compound having two intramolecular episulfide groups and a compound having one or more (preferably two) SH groups, the viscosity elevation speed during the reaction is reduced, and it becomes easy to control the end point of the reaction. Moreover, by adjusting the reaction temperature to approximately room temperature, the time required for cooling can be reduced. Furthermore, by using the polymerizable composition for optical materials having a low viscosity according to the present invention, it becomes easy to perform filtration and the injection operation, and the productivity of the optical materials can be improved.

Further, according to the present invention, an optical material, which is obtained by polymerizing and curing a preliminary reaction solution obtained by subjecting sulfur, a compound having two intramolecular episulfide groups and a compound having one or more SH groups to a prepolymerization reaction and a polymerization catalyst, can be easily released from a mold. Moreover, when compared to the conventional production methods, particularly when producing optical lenses, it is possible to produce optical lenses which have substantially no striae at a higher quality level even in the case of powerful lenses, and the productivity of optical materials can be improved.

Moreover, according to the present invention, in a prepolymerization reaction at the time of producing a polymerizable composition for optical materials using sulfur, a compound having two intramolecular episulfide groups and a compound having one or more (preferably two) SH groups, the reaction temperature is set at a temperature near room temperature, and as a result, in the production process, the temperature of the composition does not become 50° C. or more like the conventional techniques. Therefore, a side reaction is suppressed, the viscosity elevation of the polymerizable composition is suppressed, and the productivity can be improved.

EMBODIMENTS FOR CARRYING OUT THE INVENTION

The polymerizable composition for optical materials having a low viscosity, which is the objective of the present invention, has a viscosity which makes it possible to easily perform filtration and the operation of injection into the mold and enables the improvement of productivity. The viscosity at 20° C. is preferably 150 mPa·s or less, and more preferably 100 mPa·s or less.

The purity of sulfur that is the compound (a) to be used in the present invention is 98% or more. When the purity is less than 98%, the phenomenon in which clouding is generated in the optical material under the influence of impurities tends to easily occur, but when the purity is 98% or more, the phenomenon in which clouding is generated does not occur. The purity of sulfur is preferably 99.0% or more, more preferably 99.5% or more, and even more preferably 99.9% or more. Generally available sulfurs are classified into finely-powdered sulfur, colloidal sulfur, precipitated sulfur, crystalline sulfur, sublimed sulfur and the like depending on the form and purification method thereof, but in the present invention, any sulfur may be used as long as the purity thereof is 98% or more. Preferably, finely-powdered sulfur having fine particles, which is easily dissolved at the time of producing the polymerizable composition for optical materials, is used. The higher the content of sulfur atom in the polymerizable composition for optical materials is, the higher the refractive index of the obtained optical material is, but when the amount of addition is too much, some amount of sulfur may remain undissolved in the composition and the viscosity of the composition becomes significantly high. Therefore, when the total amount of the compound (a) and the compound (b) is 100 parts by mass, the amount of the compound (a) to be added is 10 to 50 parts by mass, preferably 10 to 45 parts by mass, more preferably 15 to 40 parts by mass, even more preferably 15 to 35 parts by mass, and most preferably 15 to 30 parts by mass.

When the total amount of the compound (a) and the compound (b) is 100 parts by mass, the amount of the compound (b) to be added in the present invention is 50 to 90 parts by mass, preferably 55 to 90 parts by mass, more preferably 60 to 85 parts by mass, and most preferably 70 to 85 parts by mass.

Specific examples of the compound (b) include an episulfide compound having two intramolecular episulfide groups such as bis(β-epithiopropyl)sulfide, bis(β-epithiopropyl)disulfide, bis(β-epithiopropylthio)methane, 1,2-bis(β-epithiopropylthio)ethane, 1,3-bis(β-epithiopropylthio)propane and 1,4-bis(β-epithiopropylthio)butane. As the compound (b), such compounds may be used solely, or two or more of them may be used in combination. Among them, specific preferred examples are bis(β-epithiopropyl)sulfide (formula (3)) and/or bis(β-epithiopropyl)disulfide (formula (4)), and bis(β-epithiopropyl)sulfide is most preferred:

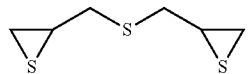

(3)

bis(β-epithiopropyl)sulfide

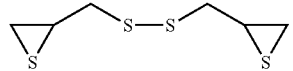

(4)

bis(β-epithiopropyl)disulfide

The compound (c) to be used in the present invention is a compound having one or more SH groups, and examples thereof include: a mercaptan derivative; a thiophenol derivative; and a mercaptan derivative and a thiophenol derivative, which have an unsaturated group such as vinyl, aromatic vinyl, methacryl, acryl and allyl. More specifically, examples of the mercaptan derivative include: a monomercaptan derivative such as methyl mercaptan, ethyl mercaptan, n-propyl mercaptan, n-butyl mercaptan, allyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, cyclohexyl mercaptan, isopropyl mercaptan, tert-butyl mercaptan, tert-nonyl mercaptan, tert-dodecyl mercaptan, benzyl mercaptan, 4-chlorobenzyl mercaptan, methylthioglycolate, ethylthioglycolate, n-butyl thioglycolate, n-octyl thioglycolate, methyl(3-mercaptopropionate), ethyl (3-mercaptopropionate), 3-methoxybutyl(3-mercaptopropionate), n-butyl(3-mercaptopropionate), 2-ethylhexyl(3-mercaptopropionate) and n-octyl(3-mercaptopropionate); and a polymercaptan derivative such as methanedithiol, 1,2-dimercaptoethane, 1,2-dimercaptopropane, 2,2-dimercaptopropane, 1,3-dimercaptopropane, 1,2,3-trimercaptopropane, 1,4-dimercaptobutane, 1,6-dimercaptohexane, bis(2-mercaptoethyl)sulfide, 1,2-bis(2-mercaptoethylthio)ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl-1,4-dimercaptobutane, 2-(2-mercaptoethylthio)-1,3-dimercaptopropane, 1,2-bis(2-mercaptoethylthio)-3-mercaptopropane, 1,1,1-tris(mercaptomethyl)propane, tetrakis(mercaptomethyl)methane, ethylene glycol bis(2-mercaptoacetate), ethylene glycol bis(3-mercaptopropionate), 1,4-butanediol bis(2-mercaptoacetate), 1,4-butanediol bis(3-mercaptopropionate), trimethylolpropane tris(2- mercaptoacetate), trimethylolpropane tris(3-mercaptopropionate), pentaerythritol tetrakis(2-mercaptoacetate), pentaerythritol tetrakis(3-mercaptopropionate), 1,1-dimercaptocyclohexane, 1,4-dimercaptocyclohexane, 1,3-dimercaptocyclohexane, 1,2-dimercaptocyclohexane, 1,4-bis(mercaptomethyl)cyclohexane, 1,3-bis(mercaptomethyl)cyclohexane, 2,5-bis(mercaptomethyl)-1,4-dithiane, 2,5-bis(2-mercaptoethyl)-1,4-dithiane, 2,5-bis(mercaptomethyl)-1-thiane, 2,5-bis(2-mercaptoethyl)-1-thiane, 1,4-bis(mercaptomethyl)benzene, 1,3-bis(mercaptomethyl)benzene, bis(4-mercaptophenyl)sulfide, bis(4-mercaptophenyl)ether, 2,2-bis(4-mercaptophenyl)propane, bis(4-mercaptomethylphenyl)sulfide, bis(4-mercaptomethylphenyl)ether, 2,2-bis(4-mercaptomethylphenyl)propane, 2,5-dimercapto-1,3,4-thiadiazole and 3,4-thiophedithiol. Examples of the thiophenol derivative include thiophenol, 4-ter-butylthiophenol, 2-methylthiophenol, 3-methylthiophenol, 4-methylthiophenol, 1,2-dimercaptobenzene, 1,3-dimercaptobenzene and 1,4-dimercaptobenzene. The mercaptan derivative having an unsaturated group and the thiophenol derivative having an unsaturated group will be specifically described below. Examples of the mercaptan derivative having an unsaturated group include allyl mercaptan, 2-vinylbenzyl mercaptan, 3-vinylbenzyl mercaptan and 4-vinylbenzyl mercaptan. Examples of the thiophenol derivative having an unsaturated group include a thiol compound containing, as the main component, one type or two or more types of substances selected from the group consisting of 2-vinylthiophenol, 3-vinylthiophenol, 4-vinylthiophenol, etc., but are not limited thereto. In the case of having one SH group, the viscosity elevation speed during the prepolymerization reaction is reduced, but Tg, heat resistance and refractive index of the obtained optical material tend to be reduced.

Meanwhile, in the case of having 3 or more SH groups, the viscosity elevation during the prepolymerization reaction may be significantly increased. Therefore, the compound having two SH groups in one molecule is preferred. Specific examples thereof include methanedithiol, 1,2-dimercaptoethane, 1,2-dimercaptopropane, 1,3-dimercaptopropane, 2,2-dimercaptopropane, 1,4-dimercaptobutane, 1,6-dimercaptohexane, bis(mercaptomethyl)ether, bis(2-mercaptoethyl)ether, bis(mercaptomethyl)sulfide, bis(2-mercaptoethyl)sulfide, bis(2-mercaptoethyl)disulfide, 1,2-bis(2-mercaptoethyloxy)ethane, 1,2-bis(2-mercaptoethylthio)ethane, 2,3-dimercapto-1-propanol, 1,3-dimercapto-2-propanol, ethyleneglycolbis(2-mercaptoacetate), ethyleneglycolbis(3-mercaptopropionate), diethyleneglycolbis(2-mercaptoacetate), diethyleneglycolbis(3-mercaptopropionate), 1,4-butanediolbis(2-mercaptoacetate), 1,4-butanediolbis(3-mercaptopropionate), 1,2-dimercaptocyclohexane, 1,3-dimercaptocyclohexane, 1,4-dimercaptocyclohexane, 1,3-bis(mercaptomethyl)cyclohexane, 1,4-bis(mercaptomethyl)cyclohexane, 2,5-bis(mercaptomethyl)-1,4-dithiane, 2,5-bis(2-mercaptoethyl)-1,4-dithiane, 2,5-bis(2-mercaptoethylthiomethyl)-1,4-dithiane, 2,5-bis(mercaptomethyl)-1-thiane, 2,5-bis(2-mercaptoethyl)-1-thiane, 2,5-bis(mercaptomethyl)thiophene, 1,2-dimercaptobenzene, 1,3-dimercaptobenzene, 1,4-dimercaptobenzene, 1,3-bis(mercaptomethyl)benzene, 1,4-bis(mercaptomethyl)benzene, 2,2'-dimercaptobiphenyl, 4,4'-dimercaptobiphenyl, bis(4-mercaptophenyl)methane, 2,2-bis(4-mercaptophenyl)propane, bis(4-mercaptophenyl)ether, bis(4-mercaptophenyl)sulfide, bis(4-mercaptophenyl)sulfone, bis(4-mercaptomethylphenyl)methane, 2,2-bis(4-mercaptomethylphenyl)propane, bis(4-mercaptomethylphenyl)ether and bis(4-mercaptomethylphenyl)sulfide. Among them, specific preferred examples are methanedithiol, 1,2-dimercaptoethane, 1,2-dimercaptopropane, 1,3-dimercaptopropane, 2,2-dimercaptopropane, bis(mercaptomethyl)ether, bis(mercaptomethyl)sulfide, bis(2-mercaptoethyl)sulfide, bis(2-mercaptoethyl)disulfide, 2,5-bis(mercaptomethyl)-1,4-dithiane, 2,5-bis(2-mercaptoethyl)-1,4-dithiane, 2,5-bis(mercaptomethyl)thiophene, 1,2-dimercaptobenzene, 1,3-dimercaptobenzene, 1,4-dimercaptobenzene, 1,3-bis(mercaptomethyl)benzene, 1,4-bis(mercaptomethyl)benzene, bis(4-mercaptophenyl)methane and bis(4-mercaptophenyl)sulfide. More preferred are methanedithiol, 1,2-dimercaptoethane, bis(2-mercaptoethyl)sulfide, bis(2-mercaptoethyl)disulfide, 2,5-bis(mercaptomethyl)-1,4-dithiane, 2,5-bis(mercaptomethyl)thiophene, 1,2-dimercaptobenzene, 1,3-dimercaptobenzene, 1,4-dimercaptobenzene, 1,3-bis(mercaptomethyl)benzene and 1,4-bis(mercaptomethyl)benzene, and particularly preferred are 1,2-dimercaptoethane, bis(2-mercaptoethyl)sulfide, 2,5-bis(mercaptomethyl)-1,4-dithiane, 1,3-bis(mercaptomethyl)benzene (also known as m-xylylenedithiol) and 1,4-bis(mercaptomethyl)benzene (also known as p-xylylenedithiol). Note that these compounds having one or more SH groups may be used solely, or two or more of them may be used in combination.

When the total amount of the compound (a) and the compound (b) is 100 parts by mass, the amount of the compound (c) to be added in the present invention is 1 to 20 parts by mass, preferably 2 to 18 parts by mass, more preferably 3 to 15 parts by mass, particularly preferably 4 to 12 parts by mass, and most preferably 5 to 10 parts by mass. When the ratio of the compound (c) is smaller than the above-described ranges, the viscosity of the preliminary reaction solution during the prepolymerization reaction may be rapidly elevated. Meanwhile, when the ratio is greater than the above-described ranges, problems such as reduction in Tg and heat resistance of the obtained optical material are caused.

The compound (d) to be used in the present invention includes all compounds represented by the aforementioned formula (2), but is preferably a low-molecular-weight compound so as not to reduce the compatibility with other components of the composition and the refractive index of a cured product obtained after polymerization and curing of the polymerizable composition for optical materials, and specifically, it is a compound represented by formula (2), wherein X is the below-described structural formula (5). Among such compounds, 1,2,2,6,6-pentamethylpiperidyl methacrylate (the below-described structural formula (6)), 1,2,2,6,6-pentamethylpiperidyl acrylate (the below-described structural formula (7)) and/or 1,2,2,6,6-pentamethylpiperidyl-4-vinylbenzoate (the below-described structural formula (8)) are preferred, and the most preferred specific example of the compound is 1,2,2,6,6-pentamethylpiperidyl methacrylate, which is easily available industrially.

When the total amount of the compound (a) and the compound (b) is 100 parts by mass, the amount of the compound (d) to be added is preferably 0.001 to 5 parts by mass, more preferably 0.002 to 3 parts by mass, and particularly preferably 0.003 to 1 part by mass.

Further, in one embodiment, when the total amount of the compound (a) and the compound (b) is 100 parts by mass, the amount of the compound (d) to be added is preferably 0.001 to 3 parts by mass, more preferably 0.002 to 1 part by mass, and particularly preferably 0.003 to 0.5 part by mass.

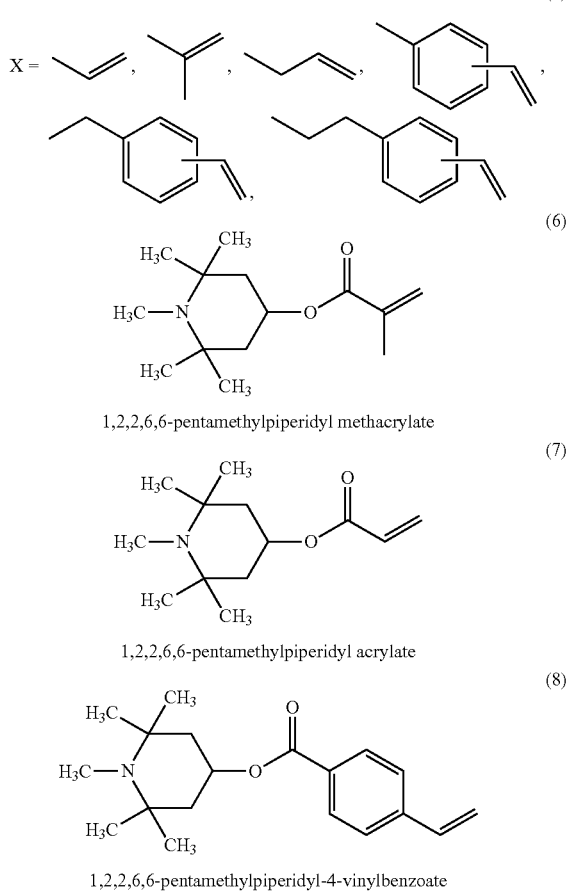

The prepolymerization reaction for obtaining the polymerizable composition for optical materials of the present invention will be described in detail below. The present invention is characterized in that sulfur that is the compound (a) and a compound having one or more (preferably two) SH groups that is the compound (c) are subjected to a prepolymerization reaction in the presence of the compound (b). The reaction between sulfur and thiol is usually promoted by heating in the presence or absence of a basic compound, and it is preferred because the reaction time can be significantly reduced by a method using a basic compound. However, since the basic compound suitably actions as a polymerization catalyst of episulfide compounds, when using a usual basic compound as a catalyst for a prepolymerization reaction of the compound (a) and the compound (c) in the presence of the compound (b), there are problems in that the viscosity of a preliminarily-reacted product (prepolymer) and/or a polymerizable composition comprising the preliminarily-reacted product (prepolymer) is increased and that the viscosity elevation speed is increased and the pot life is shortened. Under such circumstances, the present inventors diligently made researches and found that when a prepolymerization reaction is performed using 0.001 to 10 parts by mass (the upper limit is preferably 5 parts by mass or less, and more preferably 3 parts by mass or less) of the compound (d), which is a specific basic compound, as a prepolymerization catalyst, the compound (a) and the compound (c) can be subjected to the prepolymerization reaction highly selectively because the compound (d) has significantly low activity as a polymerization catalyst for episulfide compounds due to the steric hindrance caused by substituents of the amino group of the compound. In addition, it was found that when using the compound (d) as a prepolymerization catalyst, a preliminarily-reacted product (prepolymer) can be obtained without precipitation of sulfur that is the compound (a) even at a reaction temperature of approximately room temperature.

Specifically, in the method for subjecting 10 to 50 parts by mass of the compound (a) and 1 to 20 parts by mass of the compound (c) to a prepolymerization reaction in the presence of 50 to 90 parts by mass of the compound (b), using 0.001 to 10 parts by mass (the upper limit is preferably 5 parts by mass or less, and more preferably 3 parts by mass or less) of the compound (d) as a prepolymerization catalyst, the compounds (a), (b), (c) and (d) are stirred and mixed at 0° C. to 45° C., preferably at 5° C. to 40° C., and more preferably at 10° C. to 40° C. In this regard, all the components may be mixed together simultaneously in the same container with stirring. Alternatively, the components may be added and mixed in a stepwise fashion. Alternatively, respective several components may be separately mixed and then mixed again in the same container.

The reaction may be performed in any atmosphere, for example, in the presence of a gas such as nitrogen, oxygen, hydrogen and hydrogen sulfide, in a sealed atmosphere under ordinary pressure or increased/reduced pressure, or under reduced pressure, but for maintaining physical properties of the obtained optical material such as color tone, heat resistance and light resistance, it is preferred to reduce the partial pressure of an oxidizing gas such as oxygen as much as possible.

In order to detect how much the reaction has proceeded and control the reaction to produce a certain amount of the optical material, it is preferred to carry out liquid chromatography and/or the measurement of the viscosity and/or specific gravity and/or refractive index and/or the amount of generated gas at the time of the prepolymerization reaction. Note that the termination point of the prepolymerization reaction is suitably set in consideration of reprecipitation of the compound (a), the viscosity, etc. in the obtained preliminarily-reacted product (prepolymer), but it is preferred to allow 50% or more of the compound (a) to be reacted.

For the purpose of the improvement of characteristics such as oxidation resistance, weather resistance, dye-affinity, strength and refractive index, it is possible to carry out polymerization and curing with the addition of a compound which can react with a part or all of the components of the composition of the present invention and/or the polymerizable composition obtained by performing the prepolymerization reaction. Examples of the compound which can react with a part or all of the components of the composition include compounds having SH groups, epoxy compounds, iso(thio)cyanates, carboxylic acids, carboxylic acid anhydrides, phenols, amines, vinyl compounds, allyl compounds, acrylic compounds and methacrylic compounds.

Further, for polymerization and curing, a publicly-known polymerization catalyst and/or a polymerization modifier can be added according to need. Examples of the polymerization catalyst include amines, phosphines, quaternary ammonium salts, quaternary phosphonium salts, a condensation product of aldehyde with an amine-based compound, a salt of carboxylic acid and ammonia, urethanes, thiourethanes, guanidines, thioureas, thiazoles, sulfenamides, thiurams, dithiocarbamates, xanthogenates, tertiary sulfonium salts, secondary iodonium salts, mineral acids, Lewis acids, organic acids, silicic acids, tetrafluoroborates, peroxides, azo-based compounds and acidic phosphoric acid esters. These polymerization catalysts may be used solely, or two or more of them may be used in combination. Among them, specific preferred examples include quaternary ammonium salts such as tetra-n-butylammonium bromide, triethylbenzyl ammonium chloride, cetyldimethylbenzyl ammonium chloride and 1-n-dodecyl pyridinium chloride and quaternary phosphonium salts such as tetra-n-butylphosphonium bromide and tetraphenyl phosphonium bromide. Among them, specific more preferred examples are triethylbenzyl ammonium chloride and/or tetra-n-butylphosphonium bromide. Examples of the polymerization modifier include halides of elements belonging to Groups 13 to 16 of the long form of the periodic table. These polymerization modifiers may be used solely, or two or more of them may be used in combination. Among them, halides of silicon, germanium, tin and antimony are preferred, chlorides of silicon, germanium, tin and antimony are more preferred, and chlorides of germanium, tin and antimony, which have an alkyl group, are even more preferred. Specifically, dibutyltin dichloride, butyltin trichloride, dioctyltin dichloride, octyltin trichloride, dibutyldichlorogermanium, butyltrichlorogermanium, diphenyldichlorogermanium, phenyltrichlorogermanium and triphenylantimony dichloride are most preferred.

It is preferred to perform the deaeration treatment in advance before injecting the polymerizable composition for optical materials into the mold for achieving reduction in the viscosity elevation speed of the polymerizable composition and high transparency of the optical material. The deaeration treatment is carried out under reduced pressure before, during or after mixing a reaction product obtained by subjecting the compound (a), the compound (b), the compound (c) and the compound (d) to the prepolymerization reaction with a compound which can react with a part or all of the components of the composition, additives, polymerization catalyst, polymerization modifier, etc. Preferably, the deaeration treatment is carried out under reduced pressure during or after mixing. The deaeration treatment conditions are as follows: under a reduced pressure of 0.001 to 100 torr; 1 minute to 24 hours; and 0° C. to 45° C. The degree of pressure reduction is preferably 0.005 to 50 torr, and more preferably 0.01 to 30 torr. The degree of pressure reduction may be varied within these ranges. The deaeration time is preferably 5 minutes to 8 hours, and more preferably 10 minutes to 4 hours. The temperature at the time of deaeration is preferably 5 to 40° C., more preferably 10 to 40° C., and the temperature may be varied within these ranges. The operation of surface renewal of the polymerizable composition for optical materials by means of stirring, blowing a gas, vibration caused by ultrasonic wave or the like during the deaeration treatment is preferable in terms of the enhancement of the deaeration effect. Components removed by the deaeration treatment are mainly dissolved gases such as hydrogen sulfide, low-boiling substances such as low-molecular-weight mercaptan, etc., but the type of components is not particularly limited as long as the effects of the deaeration treatment are exerted.

In the method for producing an optical material of the present invention, it is surely possible to add publicly-known additives such as an antioxidant, a blueing agent, an ultraviolet absorber and a deodorizer to the polymerizable composition for optical materials to further improve practicability of the material obtained. Further, when the optical material of the present invention is easily released from the mold during polymerization, it is possible to add a publicly-known external and/or internal adhesiveness improving agent, and when the optical material is not easily released from the mold, it is possible to add a publicly-known external and/or internal mold release improving agent. It is effective to add such an agent to improve adhesiveness or mold release characteristics between the obtained optical material and the mold.

Hereinafter, the method for producing the optical material will be described in detail. The prepolymerization reaction composition obtained by subjecting the compound (a), the compound (b), the compound (c) and the compound (d) to a prepolymerization reaction is mixed with a compound which can react with a part or all of the components of the prepolymerization reaction composition. During this, various additives such as an adhesiveness improving agent or mold release improving agent, an antioxidant, a blueing agent, an ultraviolet absorber, a deodorizer and the like may be suitably added. At the time of mixing, the temperature to be set, the time required for mixing, etc. are basically not limited as long as the components can be sufficiently mixed, but excessive temperature and time cause an undesirable reaction between raw materials and additives and further cause elevation of the viscosity to make it difficult to carry out the cast molding operation, and therefore are inappropriate. The mixing temperature should be in the range of from about 5° C. to about 40° C., and preferably in the range of from 10° C. to 40° C. The mixing time is about 1 minute to 12 hours, preferably 5 minutes to 8 hours, and most preferably 5 minutes to 4 hours. According to need, mixing may be carried out with active energy ray being blocked. After that, it is preferred to carry out the deaeration treatment according to the aforementioned method. It is necessary to filter impurities and the like from the polymerizable composition for optical materials to be purified using a filter immediately before the cast molding operation for further improving the quality of the optical material of the present invention. The pore diameter of the filter to be used herein is about 0.05 to 10 µm, and generally 0.1 to 5.0 µm. The material of the filter is preferably PTFE, PET, PP or the like. If filtration is not performed or filtration is performed using a filter having a pore diameter of more than 10 µm, foreign matters may be mixed in the optical material or the transparency may be reduced, and therefore the obtained product usually cannot be used as the optical material. The polymerizable composition for optical materials thus obtained is injected into a mold made of glass or metal, and then subjected to polymerization and curing using an electric furnace, an active energy ray generation apparatus or the like. The polymerization time is 0.1 to 100 hours, and usually 1 to 48 hours. The polymerization temperature is −10 to 160° C., and usually 0 to 140° C., and in particular, the polymerization initiation temperature is generally 0 to 40° C. The polymerization may be conducted by carrying out a step of holding the composition at a predetermined polymerization temperature for a predetermined amount of time, a step of increasing the temperature at a rate of 0.1° C. to 100° C./h and a step of decreasing the temperature at a rate of 0.1° C. to 100° C./h, or a combination of these steps. Further, it is preferred to anneal the material at a temperature of 40 to 150° C. for about 5 minutes to 5 hours after the completion of the polymerization in terms of eliminating distortion of the optical material. Moreover, a surface treatment such as dyeing, hard coating, antireflection treatment, and imparting antifog properties, antifouling properties, impact resistance or the like can be performed according to need.

In the specific method for subjecting the compound (a) and the compound (c) to a prepolymerization reaction in the presence of the compound (b) in the present invention, the compound (d) is preferably added to the compounds (a), (b) and (c) and stirred and mixed at 0° C. to 45° C., preferably 5° C. to 40° C., and more preferably 10° C. to 40° C. Regarding the method of the addition at that time, the compounds (a) and (b) are mixed together with the temperature being controlled to the reaction temperature, and then the compounds (c) and (d) are mixed together and then added to the mixture. Alternatively, the compounds (a) and (b) and a part of the compound (c) are mixed together with the temperature being controlled to the reaction temperature, and then the rest of the compound (c) and the compound (d) are mixed together and then added to the mixture. Alternatively, the compounds (a), (b) and (c) are mixed together with the temperature being controlled to the reaction temperature, and then the compound (d) is added to the mixture.

The reaction may be performed in any atmosphere, for example, in the presence of a gas such as nitrogen, oxygen, hydrogen and hydrogen sulfide, in a sealed atmosphere under ordinary pressure or increased/reduced pressure, or under reduced pressure, but for maintaining physical properties of the obtained optical material such as color tone, heat resistance and light resistance, it is preferred to reduce the partial pressure of an oxidizing gas such as oxygen as much as possible.

In order to detect how much the reaction has proceeded and control the reaction to produce a certain amount of the optical material, it is preferred to carry out liquid chromatography and/or the measurement of the viscosity and/or specific gravity and/or refractive index and/or the amount of generated gas at the time of the prepolymerization reaction. Note that the termination point of the prepolymerization reaction is suitably set in consideration of reprecipitation of the compound (a), the viscosity, etc. in the obtained preliminarily-reacted product (prepolymer), but it is preferred to allow 50% or more of the compound (a) to be reacted. The prepolymerization reaction time can be controlled by the amount of the compound (d) to be added and the reaction temperature. However, when the reaction time is too short, it is difficult to control the termination point, and when the reaction time is too long, the productivity is reduced. Therefore, the reaction time is 10 minutes to 5 hours, preferably 10 minutes to 3 hours, and more preferably 10 minutes to 2 hours.

For the purpose of improving workability, it is important to control the temperature of a cast molding solution before injecting the polymerizable composition for optical materials into the mold. It is undesirable to allow the temperature to significantly change from the preliminary reaction temperature in terms of the reaction progress and the effect of viscosity elevation due to reduction in the temperature. The temperature is preferably equal to the preliminary reaction temperature +10° C. to −15° C., more preferably equal to the preliminary reaction temperature +10° C. to −10° C., even more preferably equal to the preliminary reaction temperature +5° C. to −10° C., and particularly preferably equal to the preliminary reaction temperature +5° C. to −5° C. Further, it is effective to set the temperature of the cast molding solution at near the initial polymerization temperature for obtaining good optical materials. This control of the temperature has the effect of preventing generation of striae due to convection caused by the difference between the temperature of the cast molding solution and the temperature of the polymerization furnace. This effect of preventing striae becomes the maximum when the temperature of the composition is equal to the temperature of the furnace. However, when the temperature of the cast molding solution is too low, there are problems such as dew condensation and precipitation of the compound (a), and when the temperature of the cast molding solution is too high, there is a problem in that the viscosity elevation speed becomes higher. Therefore, the temperature of the cast molding solution is preferably equal to the initial polymerization temperature +10° C. to −10° C., and more preferably equal to the initial polymerization temperature +5° C. to −5° C., and at the same time, the temperature of the cast molding solution is 0° C. to 45° C., preferably 10° C. to 40° C., and even more preferably 15° C. to 35° C.

Striae of the optical material obtained by the present invention refer to cotton-like or layered portions of a material component having a refractive index different from that of the base material in the optical material, and such striae are generated, for example, by slight sparsity/density in the optical material caused by convection of the polymerizable composition caused by heat generation during polymerization and curing, and uneven progress of the polymerization reaction. Usually, when striae of the optical material are evaluated, a light source of a mercury lamp is transmitted through the prepared optical material (optical lens), the transmitted light is projected onto a white board, and the level of striae of the outer appearance is evaluated based on the below-described criteria. Specifically, the case where no stria is visually confirmed is classified into the first grade of striae, the case where thin and dispersed striae which are barely visible are confirmed is classified into the second grade of striae, and the case where thicker striae than the second grade of striae are confirmed is classified into the third grade of striae. Preferably, 90% or more and less than 95% of the produced optical materials are classified into the first grade of striae and less than 5% of the optical materials are classified into the third grade of striae. More preferably, 90% or more and less than 95% of the produced optical materials are classified into the first grade of striae and no optical material is classified into the third grade of striae. Even more preferably, 95% or more of the produced optical materials are classified into the first grade of striae and no optical material is classified into the third grade of striae.

EXAMPLES

Hereinafter, the present invention will be specifically described by way of working examples, but the present invention is not limited thereto. Analysis of polymerizable compositions for optical materials and optical materials obtained by polymerization was conducted in manners described below.

[Viscosity of Polymerizable Compositions]

The viscosity of the prepolymerization solution at 20° C. was measured using a B-type viscometer (manufactured by Toki Sangyo Co., Ltd., TV10M).

[Measurement of Heat Resistance of Optical Materials]

An optical material was cut to have a thickness of 3 mm, and the TMA measurement (Seiko Instruments Inc., TMA/SS6100) was carried out by adding 10 g of weight to a pin (φ: 0.5 mm) and elevating the temperature at a rate of 30° C. to 10° C./min. to measure the softening point temperature (Tg).

[Refractive Index and Abbe Number of Optical Materials]

Regarding the refractive index and the Abbe number of optical materials, the refractive index at the e-line (ne) and the Abbe number at the d-line (vd) at 25° C. were measured using a digital precision refractometer (Shimadzu Corporation, KPR-200).

[Evaluation of Striae of Optical Materials (Optical Lenses)]

A light source of a mercury lamp was transmitted through the prepared optical material (optical lens), the transmitted light was projected onto a white board, and the level of striae of the outer appearance was evaluated based on the below-described criteria. The case where no stria was visually confirmed was classified into the first grade of striae, the case where thin and dispersed striae which were barely visible were confirmed was classified into the second grade of striae, and the case where thicker striae than the second grade of striae were confirmed was classified into the third grade of striae. Further, 100 optical lenses were produced and evaluated on the below-described 5-point scale.

A: 95 or more out of 100 optical lenses are classified into the first grade of striae and there is no optical lens classified into the third grade of striae.
B: 90 or more and less than 95 out of 100 optical lenses are classified into the first grade of striae and there is no optical lens classified into the third grade of striae.
C: 90 or more and less than 95 out of 100 optical lenses are classified into the first grade of striae and less than 5 optical lenses are classified into the third grade of striae.
D: 80 or more and less than 90 out of 100 optical lenses are classified into the first grade of striae and 5 or more and less than 10 optical lenses are classified into the third grade of striae.
E: 10 or more out of 100 optical lenses are classified into the third grade of striae.

[Evaluation of Mold Release Characteristics of Optical Materials (Optical Lenses)]

After a polymerizable composition was polymerized and cured, when the prepared optical material (optical lens) was released from a mold made of glass, the states of the optical lens and the mold and the mold releasing workability were evaluated on the below-described 4-point scale.

Very Good: When an optical lens is released from a mold made of glass, the optical lens can be easily released in a short time without breakage of the optical lens and the mold.
Good: When an optical lens is released from a mold made of glass, the optical lens can be released without breakage of the optical lens and the mold.
Poor: When an optical lens is released from a mold made of glass, the optical lens and the mold are not broken, but a part of the mold made of glass adheres to the optical lens or a part of the optical lens adheres to the mold made of glass, and the mold releasing workability is significantly low and it takes a long period of time.
Very Poor: An optical lens cannot be released at all, or the optical lens and/or a mold made of glass are broken.

[Color Tone of Optical Materials (YI Value)]

The YI value of a circular flat plate of a polymerized and cured product (thickness: 2.5 mm, φ: 60 mm) was measured using a spectroscopic colorimeter (Color Techno System Corporation, J5555).

Example 1

Method for Prepolymerization Reaction and Method for Producing a Polymerizable Composition To 16.0 parts by mass of sulfur as the compound (a), 84.0 parts by mass of bis(β-epithiopropyl)sulfide as the compound (b) (hereinafter referred to as the compound (b-1)) and 8.6 parts by mass of bis(2-mercaptoethyl)sulfide as the compound (c) (hereinafter referred to as the compound (c-1)), 0.020 part by mass of 1,2,2,6,6-pentamethylpiperidyl-4-methacrylate as the compound (d) (hereinafter referred to as the compound (d-1)) was added, and the mixture was subjected to a prepolymerization reaction in a nitrogen atmosphere under ordinary pressure at 30° C. The preliminary reaction solution 0.5 hour after the start of the reaction was yellow and clear, and it was a homogeneous solution without precipitation of a solid such as sulfur. In addition, the preliminary reaction solution was cooled to 20° C. for 0.1 hour. The preliminary reaction solution after cooling was yellow and clear, no solid such as sulfur was precipitated, and the viscosity at 20° C. was 30 mPa·s. To this obtained preliminary reaction solution, 0.10 part by mass of triethylbenzyl ammonium chloride as a polymerization catalyst and 0.25 part by mass of dibutyltin dichloride as a polymerization modifier were added, and the mixture was stirred and mixed while being subjected to the deaeration treatment under 10 Torr to provide a polymerizable composition. The viscosity of the obtained polymerizable composition was 30 mPa·s, and the viscosity of the polymerizable composition after being held at 20° C. for 3 hours was 35 mPa·s. The results are shown in Table 1.

(Method for Producing a Plastic Lens)

The obtained polymerizable composition was filtered using a PTFE membrane filter of 1.0 μm, and it was injected into 100 sets of each of 3 types of molds, which were composed of a glass mold (designed power (S/C) −4.0 D/0.0 D) and a gasket, a glass mold (designed power (S/C) −12.5 D/0.0 D) and a gasket, and a glass mold (designed power (S/C) −15.0 D/0.0 D) and a gasket, respectively. These molds were heated in an oven with the temperature being slowly elevated from 20° C. to 100° C. over 22 hours to be polymerized and cured, and then the molds were cooled to room temperature, and optical lenses were obtained by release from the molds. The results regarding the mold release characteristics at that time, and striae, heat resistance (Tg), YI value, refractive index and Abbe number of the optical lenses are shown in Table 1.

Example 2

Method for Prepolymerization Reaction and Method for Producing a Polymerizable Composition To 16.0 parts by mass of sulfur that is the compound (a), 84.0 parts by mass of bis(β-epithiopropyl)sulfide that is the compound (b-1) and 7.8 parts by mass of bis(2-mercaptoethyl)sulfide that is the compound (c-1), 0.020 part by mass of 1,2,2,6,6-pentamethylpiperidyl-4-methacrylate that is the compound (d-1) was added, and the mixture was subjected to a prepolymerization reaction in a nitrogen atmosphere under ordinary pressure at 30° C. The preliminary reaction solution 0.5 hour after the start of the reaction was yellow and clear, and it was a homogeneous solution without precipitation of a solid such as sulfur. In addition, the preliminary reaction solution was cooled to 20° C. for 0.1 hour while being subjected to the deaeration treatment under 10 Torr. The preliminary reaction solution after cooling was yellow and clear, no solid such as sulfur was precipitated, and the viscosity at 20° C. was 35 mPa·s. 0.10 part by mass of triethylbenzyl ammonium chloride as a polymerization catalyst and 0.25 part by mass of dibutyltin dichloride as a polymerization modifier were dissolved in 0.80 part by mass of bis(2-mercaptoethyl)sulfide that is the compound (c-1) in advance, and the mixture was added to the obtained preliminary reaction solution. Further, the obtained mixture was stirred and mixed while being subjected to the deaeration treatment under 10 Torr to provide a polymerizable composition. The viscosity of the obtained polymerizable composition was 33 mPa·s, and the viscosity of the polymerizable composition after being held at 20° C. for 3 hours was 38 mPa·s. The results are shown in Table 1.

(Method for Producing a Plastic Lens)

The obtained polymerizable composition was filtered using a PTFE membrane filter of 1.0 μm, and it was injected into 100 sets of each of 3 types of molds, which were composed of a glass mold (designed power (S/C) −4.0 D/0.0 D) and a gasket, a glass mold (designed power (S/C) −12.5 D/0.0 D) and a gasket, and a glass mold (designed power (S/C) −15.0 D/0.0 D) and a gasket, respectively. These molds were heated in an oven with the temperature being slowly elevated from 20° C. to 100° C. over 22 hours to be polymerized and cured, and then the molds were cooled to room temperature, and optical lenses were obtained by release from the molds. The results regarding the mold release characteristics at that time, and striae, heat resistance (Tg), YI value, refractive index and Abbe number of the optical lenses are shown in Table 1.

Examples 3-6

The process was carried out in a manner similar to that in Example 1, except that the respective compounds and amounts were changed to those described in Table 1. Further, the results regarding the viscosity of the obtained polymerizable composition, and the mold release characteristics, striae, heat resistance (Tg), YI value, refractive index and Abbe number of the optical lenses are shown in Table 1.

Examples 7-10

The process was carried out in a manner similar to that in Example 2, except that the respective compounds and amounts were changed to those described in Table 1. Further, the results regarding the viscosity of the obtained polymerizable composition, and the mold release characteristics, striae, heat resistance (Tg), YI value, refractive index and Abbe number of the optical lenses are shown in Table 1.

Example 11

15.5 parts by mass of sulfur that is the compound (a), 84.5 parts by mass of the compound (b-1) as the compound (b), 8.6 parts by mass of the compound (c-1) as the compound (c) and 0.016 part by mass of the compound (d-1) as the compound (d) were added, and the mixture was reacted in a nitrogen atmosphere under ordinary pressure at 30° C. for 1.0 hour. To the obtained reaction solution, 0.9 part by mass of the compound (c-1), 0.37 part by mass of dibutyltin dichloride and 0.16 part by mass of triethylbenzyl ammonium chloride were added, and the mixture was cooled to 25° C. that is the temperature at the time of cast molding while being subjected to the deaeration treatment under 10 Torr, thereby obtaining a polymerizable composition for optical materials without turbidity. The viscosity of the obtained composition at 25° C. that is the temperature at the time of cast molding was 40 mPa·s, and the viscosity of the composition after being held at the temperature at the time of cast molding for 3 hours was 82 mPa·s.

Subsequently, optical lenses were obtained according to the method described in Example 1. The results are shown in Table 3.

Example 12

15.5 parts by mass of sulfur that is the compound (a), 84.5 parts by mass of the compound (b-1) as the compound (b), 8.6 parts by mass of the compound (c-1) and 0.005 part by mass of the compound (d-1) as the compound (d) were added, and the mixture was reacted in a nitrogen atmosphere under ordinary pressure at 40° C. for 1.5 hours. To the obtained reaction solution, 0.9 part by mass of the compound (c-1), 0.37 part by mass of dibutyltin dichloride and 0.16 part by mass of triethylbenzyl ammonium chloride were added, and the mixture was cooled to 30° C. that is the temperature at the time of cast molding while being subjected to the deaeration treatment under 10 Torr, thereby obtaining a polymerizable composition for optical materials without turbidity. The viscosity of the obtained composition at 30° C. that is the temperature at the time of cast molding was 36 mPa·s, and the viscosity of the composition after being held at the temperature at the time of cast molding for 3 hours was 110 mPa·s.

Subsequently, optical lenses were obtained according to the method described in Example 1. The results are shown in Table 3.

Example 13

15.5 parts by mass of sulfur that is the compound (a), 84.5 parts by mass of the compound (b-1) as the compound (b), 8.6 parts by mass of the compound (c-1) and 0.016 part by mass of 1,2,2,6,6-pentamethylpiperidyl acrylate (hereinafter referred to as the compound (d-2)) as the compound (d) were added, and the mixture was reacted in a nitrogen atmosphere under ordinary pressure at 25° C. for 1.5 hours. To the obtained reaction solution, 0.9 part by mass of the compound (c-1), 0.37 part by mass of dibutyltin dichloride and 0.16 part by mass of triethylbenzyl ammonium chloride were added, and the mixture was held at 25° C. that is the temperature at the time of cast molding while being subjected to the deaeration treatment under 10 Torr, thereby obtaining a polymerizable composition for optical materials without turbidity. The viscosity of the obtained composition at 25° C. that is the temperature at the time of cast molding was 42 mPa·s, and the viscosity of the composition after being held at the temperature at the time of cast molding for 3 hours was 85 mPa·s.

Subsequently, optical lenses were obtained according to the method described in Example 1. The results are shown in Table 3.

Example 14

10.0 parts by mass of sulfur that is the compound (a), 90.0 parts by mass of bis(β-epithiopropyl)disulfide as the compound (b) (hereinafter referred to as the compound (b-2)), 5.0 parts by mass of the compound (c-1) as the compound (c) and 0.1 part by mass of the compound (d-1) were added, and the mixture was reacted in a nitrogen atmosphere under ordinary pressure at 5° C. for 1.2 hours. To the obtained reaction solution, 0.9 part by mass of the compound (c-1), 0.37 part by mass of dibutyltin dichloride and 0.16 part by mass of triethylbenzyl ammonium chloride were added, and the mixture was heated to 15° C. that is the temperature at the time of cast molding while being subjected to the deaeration treatment under 10 Torr, thereby obtaining a polymerizable composition for optical materials without turbidity. The viscosity of the obtained composition at 15° C. that is the temperature at the time of cast molding was 90 mPa·s, and the viscosity of the composition after being held at the temperature at the time of cast molding for 3 hours was 103 mPa·s.

Subsequently, optical lenses were obtained according to the method described in Example 1. The results are shown in Table 3.

Example 15

20.0 parts by mass of sulfur that is the compound (a), 80.0 parts by mass of the compound (b-1) as the compound (b), 10.0 parts by mass of the compound (c-1) and 0.016 part by mass of the compound (d-1) as the compound (d) were added, and the mixture was reacted in a nitrogen atmosphere under ordinary pressure at 30° C. for 1.5 hours. To the obtained reaction solution, 0.9 part by mass of the compound (c-1), 0.37 part by mass of dibutyltin dichloride and 0.16 part by mass of triethylbenzyl ammonium chloride were added, and the mixture was cooled to 20° C. that is the temperature at the time of cast molding while being subjected to the deaeration treatment under 10 Torr, thereby obtaining a polymerizable composition for optical materials without turbidity. The viscosity of the obtained composition at 20° C. that is the temperature at the time of cast molding was 82 mPa·s, and the viscosity of the composition after being held at the temperature at the time of cast molding for 3 hours was 115 mPa·s.

Subsequently, optical lenses were obtained according to the method described in Example 1. The results are shown in Table 3.

Example 16

30.0 parts by mass of sulfur that is the compound (a), 70.0 parts by mass of the compound (b-1) as the compound (b), 15.0 parts by mass of the compound (c-1) and 0.033 part by mass of the compound (d-1) as the compound (d) were added, and the mixture was reacted in a nitrogen atmosphere under ordinary pressure at 30° C. for 1.0 hour. To the obtained reaction solution, 0.9 part by mass of the compound (c-1), 0.37 part by mass of dibutyltin dichloride and 0.16 part by mass of triethylbenzyl ammonium chloride were added, and the mixture was cooled to 25° C. that is the temperature at the time of cast molding while being subjected to the deaeration treatment under 10 Torr, thereby obtaining a polymerizable composition for optical materials without turbidity. The viscosity of the obtained composition at 25° C. that is the temperature at the time of cast molding was 55 mPa·s, and the viscosity of the composition after being held at the temperature at the time of cast molding for 3 hours was 96 mPa·s.

Subsequently, optical lenses were obtained according to the method described in Example 1. The results are shown in Table 3.

Comparative Example 1

Method for Prepolymerization Reaction and Method for Producing a Polymerizable Composition 16.0 parts by mass of sulfur that is the compound (a) and 84.0 parts by mass of bis(β-epithiopropyl)sulfide that is the compound (b-1) were mixed well at 60° C. to provide a homogeneous solution. Subsequently, 0.50 part by mass of 2-mercapto-1-methylimidazole (referred to as MMI) as a prepolymerization catalyst was added thereto, and the mixture was subjected to a prepolymerization reaction at 60° C. The obtained preliminary reaction solution was cooled to 20° C. The preliminary reaction solution after cooling was yellow and clear, no solid such as sulfur was precipitated, and the viscosity at 20° C. was 70 mPa·s. 0.03 part by mass of triethylbenzyl ammonium chloride as a polymerization catalyst and 0.20 part by mass of dibutyltin dichloride as a polymerization modifier were dissolved in 8.6 parts by mass of bis(2-mercaptoethyl)sulfide that is the compound (c-1) in advance, and the mixture was added to the obtained preliminary reaction solution. Further, the obtained mixture was stirred and mixed while being subjected to the deaeration treatment under 10 Torr to provide a polymerizable composition. The viscosity of the obtained polymerizable composition was 80 mPa·s, and the viscosity of the polymerizable composition after being held at 20° C. for 3 hours was 130 mPa·s. The results are shown in Table 2.

(Method for Producing a Plastic Lens)

The obtained polymerizable composition was filtered using a PTFE membrane filter of 1.0 μm, and it was injected into 100 sets of each of 3 types of molds, which were composed of a glass mold (designed power (S/C) −4.0 D/0.0 D) and a gasket, a glass mold (designed power (S/C) −12.5 D/0.0 D) and a gasket, and a glass mold (designed power (S/C) −15.0 D/0.0 D) and a gasket, respectively. These molds were heated in an oven with the temperature being slowly elevated from 20° C. to 100° C. over 22 hours to be polymerized and cured, and then the molds were cooled to room temperature, and optical lenses were obtained by release from the molds. The results regarding the mold release characteristics at that time, and striae, heat resistance (Tg), YI value, refractive index and Abbe number of the optical lenses are shown in Table 2.

Comparative Example 2

Method for Prepolymerization Reaction and Method for Producing a Polymerizable Composition 16.0 parts by mass of sulfur that is the compound (a), 84.0 parts by mass of bis(β-epithiopropyl)sulfide that is the compound (b-1) and 7.8 parts by mass of bis(2-mercaptoethyl)sulfide that is the compound (c-1) were mixed well at 60° C. to provide a homogeneous solution. Subsequently, 0.50 part by mass of 2-mercapto-1-methylimidazole (referred to as MMI) as a prepolymerization catalyst was added thereto, and the mixture was subjected to a prepolymerization reaction at 60° C. The obtained preliminary reaction solution was cooled to 20° C. The preliminary reaction solution after cooling was yellow and clear, no solid such as sulfur was precipitated, and the viscosity at 20° C. was 50 mPa·s. 0.03 part by mass of triethylbenzyl ammonium chloride as a polymerization catalyst and 0.20 part by mass of dibutyltin dichloride as a polymerization modifier were dissolved in 0.8 part by mass of bis(2-mercaptoethyl)sulfide that is the compound (c-1) in advance, and the mixture was added to the obtained preliminary reaction solution. Further, the obtained mixture was stirred and mixed while being subjected to the deaeration treatment under 10 Torr to provide a polymerizable composition. The viscosity of the obtained polymerizable composition was 55 mPa·s, and the viscosity of the polymerizable composition after being held at 20° C. for 3 hours was 115 mPa·s. The results are shown in Table 2.

(Method for Producing a Plastic Lens)

The obtained polymerizable composition was filtered using a PTFE membrane filter of 1.0 μm, and it was injected into 100 sets of each of 3 types of molds, which were composed of a glass mold (designed power (S/C) −4.0 D/0.0 D) and a gasket, a glass mold (designed power (S/C) −12.5 D/0.0 D) and a gasket, and a glass mold (designed power (S/C) −15.0 D/0.0 D) and a gasket, respectively. These molds were heated in an oven with the temperature being slowly elevated from 20° C. to 100° C. over 22 hours to be polymerized and cured, and then the molds were cooled to room temperature, and optical lenses were obtained by release from the molds. The results regarding the mold release characteristics at that time, and striae, heat resistance (Tg), YI value, refractive index and Abbe number of the optical lenses are shown in Table 2.

Comparative Example 3

The process was carried out in a manner similar to that in Example 1, except that the amount of the compound (d) was changed. However, a rapid polymerization occurred, and no optical material was obtained.

Comparative Example 4

The process was carried out in a manner similar to that in Example 1, except that the amount of the compound (d) was changed. However, sulfur partially remained undissolved, and no homogeneous optical material was obtained.

Comparative Example 5

The process was carried out in a manner similar to that in Comparative Example 1, except that 0.01 part by mass of dioctyl acid phosphate as an internal mold release agent was added at the time of obtaining a homogeneous solution at 60° C.

The results regarding the viscosity of the obtained polymerizable composition at that time, and the mold release characteristics, striae, heat resistance (Tg), YI value, refractive index and Abbe number of the optical lenses are shown in Table 2. However, thin turbidity was generated in all of the obtained optical lenses.

Comparative Example 6

The process was carried out in a manner similar to that in Comparative Example 5, except that 0.01 part by mass of DS-401 (Daikin Industries, Ltd.) was used instead of dioctyl acid phosphate as an internal mold release agent. The results regarding the viscosity of the obtained polymerizable composition at that time, and the mold release characteristics, striae, heat resistance (Tg), YI value, refractive index and Abbe number of the optical lenses are shown in Table 2. However, thin turbidity was generated in all of the obtained optical lenses.

Comparative Example 7

The process was carried out in a manner similar to that in Comparative Example 1, except that YSR-6209 (Toshiba Silicone Co., Ltd.) as an external mold release agent was applied to molds. However, turbidity was generated in all of the obtained optical lenses, and the surfaces of the optical lenses were rough.

Comparative Example 8

The process was carried out in a manner similar to that in Example 1, except that 2,2,6,6-tetramethylpiperidyl-4-methacrylate (referred to as TMPM) was used instead of the compound (d). However, a rapid polymerization occurred, and no optical material was obtained.

Comparative Example 9

The process was carried out in a manner similar to that in Example 1, except that 1,2,2,6,6-tetramethylpiperidine (referred to as PMP) was used instead of the compound (d). However, a rapid polymerization occurred, and no optical material was obtained.

Comparative Example 10

15.5 parts by mass of sulfur that is the compound (a), 84.5 parts by mass of the compound (b-1) as the compound (b) and 8.6 parts by mass of the compound (c-1) were reacted in a nitrogen atmosphere under ordinary pressure at 60° C. for 24 hours without the addition of the compound (d), but sulfur remained.

Comparative Example 11

15.5 parts by mass of sulfur that is the compound (a), 84.5 parts by mass of the compound (b-1) as the compound (b), 8.6 parts by mass of the compound (c-1) and 0.016 part by mass of the compound (d-1) as the compound (d) were added, and the mixture was reacted in a nitrogen atmosphere under ordinary pressure at 50° C. for 1.0 hour. To the obtained reaction solution, 0.9 part by mass of the compound (c-1), 0.37 part by mass of dibutyltin dichloride and 0.16 part by mass of triethylbenzyl ammonium chloride were added, and the mixture was cooled to 40° C. that is the temperature at the time of cast molding while being subjected to the deaeration treatment under 10 Torr, thereby obtaining a polymerizable composition for optical materials without turbidity. The viscosity of the obtained composition at 40° C. that is the temperature at the time of cast molding was 160 mPa·s, and the viscosity of the composition after being held at the temperature at the time of cast molding for 3 hours was 820 mPa·s.

Subsequently, optical lenses were obtained according to the method described in Example 1. The results are shown in Table 3.

Comparative Example 12

15.5 parts by mass of sulfur that is the compound (a), 84.5 parts by mass of the compound (b-1) as the compound (b), 8.6 parts by mass of the compound (c-1) and 0.2 part by mass of the compound (d-1) as the compound (d) were reacted in a nitrogen atmosphere under ordinary pressure at −5° C. for 1.0 hour, but sulfur remained.

Comparative Example 13

15.5 parts by mass of sulfur that is the compound (a), 84.5 parts by mass of the compound (b-1) as the compound (b), 8.6 parts by mass of the compound (c-1) and 0.016 part by mass of the compound (d-1) as the compound (d) were added, and the mixture was reacted in a nitrogen atmosphere under ordinary pressure at 45° C. for 1.0 hour. To the obtained reaction solution, 0.9 part by mass of the compound (c-1), 0.37 part by mass of dibutyltin dichloride and 0.16 part by mass of triethylbenzyl ammonium chloride were added, and the mixture was cooled to 25° C. that is the temperature at the time of cast molding while being subjected to the deaeration treatment under 10 Torr, thereby obtaining a polymerizable composition for optical materials without turbidity. The viscosity of the obtained composition at 25° C. that is the temperature at the time of cast molding was 210 mPa·s, and the viscosity of the composition after being held at the temperature at the time of cast molding for 3 hours was 450 mPa·s.

Subsequently, optical lenses were obtained according to the method described in Example 2. The results are shown in Table 3.

Comparative Example 14

15.5 parts by mass of sulfur that is the compound (a), 84.5 parts by mass of the compound (b-1) as the compound (b), 8.6 parts by mass of the compound (c-1) and 0.016 part by mass of the compound (d-1) as the compound (d) were added, and the mixture was reacted in a nitrogen atmosphere under ordinary pressure at 25° C. for 1.5 hours. To the obtained reaction solution, 0.9 part by mass of the compound (c-1), 0.37 part by mass of dibutyltin dichloride and 0.16 part by mass of triethylbenzyl ammonium chloride were added, and the mixture was heated to 40° C. that is the temperature at the time of cast molding while being subjected to the deaeration treatment under 10 Torr, thereby obtaining a polymerizable composition for optical materials without turbidity. The viscosity of the obtained composition at 40° C. that is the temperature at the time of cast molding was 30 mPa·s, and the viscosity of the composition after being held at the temperature at the time of cast molding for 3 hours was 260 mPa·s.

Subsequently, optical lenses were obtained according to the method described in Example 2. The results are shown in Table 3.

Comparative Example 15

15.5 parts by mass of sulfur that is the compound (a), 84.5 parts by mass of the compound (b-1) as the compound (b), 8.6 parts by mass of the compound (c-1) and 0.05 part by mass of MMI as the compound (d) were reacted in a nitrogen atmosphere under ordinary pressure at 30° C. for 24 hours, but sulfur remained.

TABLE 1

| | Polymerizable composition (parts by mass) | | | | | | | Viscosity of composition |
|---|---|---|---|---|---|---|---|---|
| | Prepolymerization reaction composition (parts by mass) | | | | | | | |
| | Compound (a) | Compound (b) | Compound (c) | Compoud (d) | Others | Solution turbidity | Viscosity of prepolymer | Immediately after |
| Example 1 | Sulfur (16.0) | b-1 (84.0) | c-1 (8.6) | d-1 (0.020) | TEBAB (0.10) DBTC (0.25) | ○ | 30 | 30 |
| Example 2 | Sulfur (16.0) | b-1 (84.0) | c-1 (7.8) | d-1 (0.020) | c-1 (0.80) TEBAB (0.10) DBTC (0.25) | ○ | 33 | 38 |
| Example 3 | Sulfur (16.0) | b-1 (84.0) | c-3 (9.0) | d-1 (0.015) | TEBAB (0.10) DBTC (0.25) | ○ | 34 | 35 |
| Example 4 | Sulfur (16.0) | b-1 (84.0) | c-6 (7.8) | d-1 (0.025) | TEBAB (0.10) DBTC (0.25) | ○ | 40 | 41 |
| Example 5 | Sulfur (10.5) | b-1 (89.5) | c-1 (3.5) | d-1 (1.0) | TEBAB (0.10) DBTC (0.25) | ○ | 60 | 63 |
| Example 6 | Sulfur (16.0) | b-2 (84.0) | c-1 (8.6) | d-1 (0.020) | TEBAB (0.10) DBTC (0.25) | ○ | 30 | 30 |
| Example 7 | Sulfur (26.0) | b-1 (74.0) | c-5 (10.0) | d-1 (0.25) | c-1 (0.80) TEBAB (0.10) DBTC (0.25) | ○ | 100 | 95 |
| Example 8 | Sulfur (16.0) | b-2 (84.0) | c-1 (4.0) | d-3 (0.020) | c-1 (4.00) TEBAB (0.10) DBTC (0.25) | ○ | 40 | 35 |
| Example 9 | Sulfur (16.0) | b-1 (84.0) | c-1 (7.8) | d-3 (0.010) | c-2 (0.80) TEBAB (0.10) DBTC (0.25) | ○ | 30 | 30 |
| Example 10 | Sulfur (16.0) | b-1 (84.0) | c-3 (13.0) | d-1 (0.002) | c-3 (0.50) TEBAB (0.10) DBTC (0.25) | ○ | 32 | 33 |

| | Optical material (optical lens) | | | | | | | |
|---|---|---|---|---|---|---|---|---|
| | 3 hours later | Heat resistance Tg (° C.) | YI value | Refractive index ne | Abbe number νd | Power | Mold release characteristics | Striae |
| Example 1 | 35 | 80 | 1.6 | 1.73 | 33 | −4.0D | Very Good | A |
| | | | | | | −12.5D | Very Good | A |
| | | | | | | −15.0D | Very Good | A |
| Example 2 | 45 | 80 | 1.6 | 1.73 | 33 | −4.0D | Very Good | A |
| | | | | | | −12.5D | Very Good | A |
| | | | | | | −15.0D | Very Good | A |
| Example 3 | 40 | 86 | 1.6 | 1.74 | 33 | −4.0D | Very Good | A |
| | | | | | | −12.5D | Very Good | A |
| | | | | | | −15.0D | Very Good | A |
| Example 4 | 46 | 70 | 2.4 | 1.73 | 32 | −4.0D | Very Good | A |
| | | | | | | −12.5D | Very Good | A |
| | | | | | | −15.0D | Very Good | A |
| Example 5 | 82 | 88 | 2.6 | 1.72 | 34 | −4.0D | Very Good | A |
| | | | | | | −12.5D | Very Good | A |
| | | | | | | −15.0D | Good | B |

TABLE 1-continued

| | | | | | | | | |
|---|---|---|---|---|---|---|---|---|
| Example 6 | 35 | 80 | 1.6 | 1.74 | 33 | −4.0D | Very Good | A |
| | | | | | | −12.5D | Very Good | A |
| | | | | | | −15.0D | Very Good | A |
| Example 7 | 105 | 77 | 3.7 | 1.76 | 32 | −4.0D | Very Good | A |
| | | | | | | −12.5D | Very Good | A |
| | | | | | | −15.0D | Very Good | A |
| Example 8 | 40 | 83 | 1.5 | 1.73 | 33 | −4.0D | Very Good | A |
| | | | | | | −12.5D | Very Good | A |
| | | | | | | −15.0D | Very Good | A |
| Example 9 | 35 | 80 | 1.7 | 1.73 | 33 | −4.0D | Very Good | A |
| | | | | | | −12.5D | Very Good | A |
| | | | | | | −15.0D | Very Good | A |
| Example 10 | 38 | 75 | 1.4 | 1.73 | 33 | −4.0D | Very Good | A |
| | | | | | | −12.5D | Good | A |
| | | | | | | −15.0D | Good | B |

TABLE 2

| | Polymerizable composition (parts by mass) | | | | | | | Viscosity of composition | |
|---|---|---|---|---|---|---|---|---|---|
| | Prepolymerization reaction composition (parts by mass) | | | | | | | | |
| | Compound (a) | Compound (b) | Compound (c) | Compoud (d) | Others | | Solution turbidity | Viscosity of prepolymer | Immediately after |
| Comparative Example 1 | Sulfur (16.0) | b-1 (84.0) | — | MMI (0.50) | c-1 (8.6) TEBAB (0.03) DBTC (0.20) | | ○ | 70 | 80 |
| Comparative Example 2 | Sulfur (16.0) | b-1 (84.0) | c-1 (7.8) | MMI (0.50) | c-1 (0.80) TEBAB (0.03) DBTC (0.20) | | ○ | 50 | 55 |
| Comparative Example 3 | Sulfur (16.0) | b-1 (84.0) | c-1 (8.6) | d-1 (7.5) | TEBAB (0.10) DBTC (0.25) | | — | Rapid polymerization | — |
| Comparative Example 4 | Sulfur (16.0) | b-1 (84.0) | c-1 (8.6) | d-1 (0.020) | TEBAB (0.10) DBT C(0.25) | | X | — | — |
| Comparative Example 5 | Sulfur (16.0) | b-1 (84.0) | — | MMI (0.50) | c-1 (8.6) TEBAB (0.03) DBTC (0.20) | | ○ | 70 | 80 |
| Comparative Example 6 | Sulfur (16.0) | b-1 (84.0) | — | MMI (0.50) | c-1 (8.6) TEBAB (0.03) DBTC (0.20) | | ○ | 70 | 80 |
| Comparative Example 7 | Sulfur (16.0) | b-1 (84.0) | — | MMI (0.50) | c-1 (8.6) TEBAB (0.03) DBTC (0.20) | | ○ | 70 | 80 |
| Comparative Example 8 | Sulfur (16.0) | b-1 (84.0) | c-1 (8.6) | TMPM (0.020) | TEBAB (0.10) DBTC (0.25) | | — | Rapid polymerization | — |
| Comparative Example 9 | Sulfur (16.0) | b-1 (84.0) | c-1 (8.6) | PMP (0.020) | TEBAB (0.10) DBTC (0.25) | | — | Rapid polymerization | — |

| | Optical material (optical lens) | | | | | | | |
|---|---|---|---|---|---|---|---|---|
| | 3 hours later | Heat resistance Tg (° C.) | YI value | Refractive index ne | Abbe number vd | Power | Mold release characteristics | Striae | Remarks |
| Comparative Example 1 | 130 | 80 | 1.6 | 1.73 | 33 | −4.0D −12.5D −15.0D | Good Poor Very Poor | B C D | |
| Comparative Example 2 | 115 | 80 | 1.6 | 1.73 | 33 | −4.0D −12.5D −15.0D | Good Poor Poor | B B C | |
| Comparative Example 3 | — | — | | | | | | | |
| Comparative Example 4 | — | — | | | | | | | |
| Comparative Example 5 | 130 | 80 | 2.0 | 1.73 | 33 | −4.0D −12.5D −15.0D | Very Good Very Good Good | B C E | Turbidity |
| Comparative Example 6 | 130 | 80 | 2.2 | 1.73 | 33 | −4.0D −12.5D −15.0D | Very Good Very Good Good | C D E | Turbidity |

TABLE 2-continued

| | | | | | | | | | | |
|---|---|---|---|---|---|---|---|---|---|---|
| Comparative Example 7 | 130 | 80 | 2.5 | 1.73 | 33 | −4.0D Very Good<br>−12.5D Very Good<br>−15.0D Very Good | | B<br>C<br>D | Turbidity,<br>surface<br>roughness |
| Comparative Example 8 | — | \multicolumn{8}{l}{Rapid polymerization occurred and no optical material was otained} | | | | |
| Comparative Example 9 | — | \multicolumn{8}{l}{Rapid polymerization occurred and no optical material was otained} | | | | |

TABLE 3

| | Prepolymer | | | | | | | |
|---|---|---|---|---|---|---|---|---|
| | Compound (a) | Compond (b) | Compound (c) | Preliminary reaction catalyst | Reaction temperature | Reaction time | Temperature at the time of cast molding | Solution turbidity |
| Example 11 | Sulfur: 15.5 | b-1: 84.5 | c-1: 8.6 | d-1: 0.016 | 30° C. | 1.0 hr | 25° C. | absent |
| Example 12 | Sulfur: 15.5 | b-1: 84.5 | c-1: 8.6 | d-1: 0.005 | 40° C. | 1.5 hr | 30° C. | absent |
| Example 13 | Sulfur: 15.5 | b-1: 84.5 | c-1: 8.6 | d-2: 0.016 | 25° C. | 1.5 hr | 25° C. | absent |
| Example 14 | Sulfur: 10.0 | b-2: 90.0 | c-1: 5.0 | d-1: 0.1 | 5° C. | 1.2 hr | 15° C. | absent |
| Example 15 | Sulfur: 20.0 | b-1: 80.0 | c-1: 10.0 | d-1: 0.016 | 30° C. | 1.5 hr | 20° C. | absent |
| Example 16 | Sulfur: 30.0 | b-1: 70.0 | c-1: 15.0 | d-1: 0.033 | 30° C. | 1.0 hr | 25° C. | absent |
| Comparative Example 10 | Sulfur: 15.5 | b-1: 84.5 | c-1: 8.6 | — | 30° C. | 24 hr | — | present |
| Comparative Example 11 | Sulfur: 15.5 | b-1: 84.5 | c-1: 8.6 | d-1: 0.016 | 50° C. | 1.0 hr | 40° C. | absent |
| Comparative Example 12 | Sulfur: 15.5 | b-1: 84.5 | c-1: 8.6 | d-1: 0.2 | −5° C. | 1.0 hr | — | present |
| Comparative Example 13 | Sulfur: 15.5 | b-1: 84.5 | c-1: 8.6 | d-1: 0.016 | 45° C. | 1.0 hr | 25° C. | absent |
| Comparative Example 14 | Sulfur: 15.5 | b-1: 84.5 | c-1: 8.6 | d-1: 0.016 | 25° C. | 1.5 hr | 40° C. | absent |
| Comparative Example 15 | Sulfur: 15.5 | b-1: 84.5 | c-1: 8.6 | MMI: 0.05 | 30° C. | 1.5 hr | — | present |

| | Composition | | Optical material | | | | | |
|---|---|---|---|---|---|---|---|---|
| | Viscosity of composition (mPa · s) | | Initial polymerization temperature and result of striae | | | Refractive index ($n_e$) | Abbe number ($v_d$) | Heat resistance softening point (° C.) |
| | Immediately after | 3 hours later | 5° C. | 20° C. | 35° C. | | | |
| Example 11 | 40 | 82 | D | A | B | 1.73 | 33 | 80 |
| Example 12 | 36 | 110 | E | B | A | 1.73 | 33 | 79 |
| Example 13 | 42 | 85 | D | A | B | 1.73 | 33 | 80 |
| Example 14 | 90 | 103 | B | A | D | 1.75 | 31 | 82 |
| Example 15 | 82 | 115 | C | A | C | 1.75 | 31 | 76 |
| Example 16 | 55 | 96 | D | A | B | 1.76 | 30 | 52 |
| Comparative Example 10 | — | — | — | — | — | — | — | — |
| Comparative Example 11 | 160 | 820 | E | D | B | 1.73 | 33 | 79 |
| Comparative Example 12 | — | — | — | — | — | — | — | — |
| Comparative Example 13 | 210 | 450 | D | B | C | 1.73 | 33 | 80 |
| Comparative Example 14 | 30 | 260 | E | D | B | 1.73 | 33 | 80 |
| Comparative Example 15 | — | — | — | — | — | — | — | — |

Note that the letters and numerals in the above-described Tables 1-3 mean the below-described substances.
(a) sulfur
(b-1) bis(β-epithiopropyl)sulfide
(b-2) bis(β-epithiopropyl)disulfide
(c-1) bis(2-mercaptoethyl)sulfide
(c-2) m-xylylenedithiol
(c-3) 2,5-bis(mercaptomethyl)-1,4-dithiane
(c-4) p-xylylenedithiol
(c-5) 1,2-dimercaptoethane
(c-6) thiopheol
(d-1) 1,2,2,6,6-pentamethylpiperidyl-4-methacrylate
(d-2) 1,2,2,6,6-pentamethylpiperidyl-4-acrylate
(d-3) 1,2,2,6,6-pentamethylpiperidyl-4-vinylbenzoate
MMI: 2-mercapto-1-methylimidazole
TMPM: 2,2,6,6-tetramethylpiperidyl-4-methacrylate
PMP: 1,2,2,6,6-pentamethylpiperidine
TEBAC: triethyl benzyl ammonium chloride
DBTC: dibutyltin dichloride

The invention claimed is:
1. A polymerizable composition for optical materials, which comprises: a preliminary reaction solution obtained by subjecting 10 to 50 parts by mass of the below-described compound (a) and 1 to 20 parts by mass of the below-described compound (c) to a prepolymerization reaction in the presence of 50 to 90 parts by mass of the below-described compound (b) with the proviso that the total amount of the compound (a) and the compound (b) is 100 parts by mass, using 0.001 to 5 parts by mass of the below-described compound (d) as a prepolymerization catalyst; and a polymerization catalyst:

(a) sulfur (the compound (a));

(b) a compound having two intramolecular episulfide groups represented by the following formula (1) (the compound (b)):

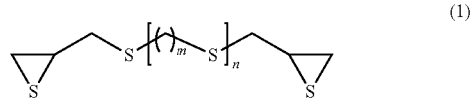
(1)

wherein m represents an integer from 0 to 4, and n represents an integer from 0 to 1;

(c) a compound having one or more SH groups (the compound (c));

(d) a compound represented by the following formula (2) (the compound (d)):

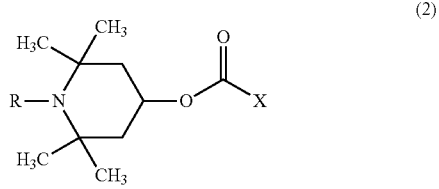
(2)

wherein R represents an alkyl group having 1 to 4 carbon atoms, and X represents an organic group having 2 to 11 carbon atoms, which has any of a vinyl group, a vinylidene group and a vinylene group, wherein said polymerizable composition has a viscosity of 63 mPa·s or less.

2. A method for producing a polymerizable composition for optical materials, according to claim 1, which comprises the steps of:

subjecting 10 to 50 parts by mass of the below-described compound (a) and 1 to 20 parts by mass of the below-described compound (c) to a prepolymerization reaction in the presence of 50 to 90 parts by mass of the below-described compound (b) with the proviso that the total amount of the compound (a) and the compound (b) is 100 parts by mass, using 0.001 to 5 parts by mass of the below-described compound (d) as a prepolymerization catalyst, to obtain a preliminary reaction solution; and adding a polymerization catalyst to the preliminary reaction solution:

(a) sulfur (the compound (a));

(b) a compound having two intramolecular episulfide groups represented by the following formula (1) (the compound (b)):

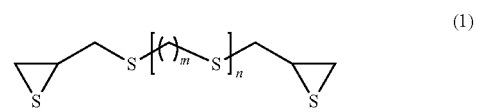
(1)

wherein m represents an integer from 0 to 4, and n represents an integer from 0 to 1;

(c) a compound having one or more SH groups (the compound (c));

(d) a compound represented by the following formula (2) (the compound (d)):

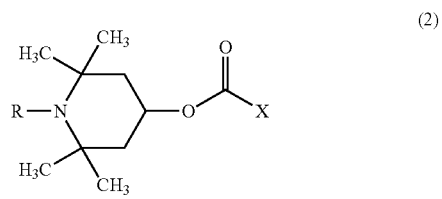
(2)

wherein R represents an alkyl group having 1 to 4 carbon atoms, and X represents an organic group having 2 to 11 carbon atoms, which has any of a vinyl group, a vinylidene group and a vinylene group.

3. The polymerizable composition for optical materials according to claim 1, wherein the polymerizable composition for optical materials is obtained by further adding the polymerization catalyst and the compound (c) to the preliminary reaction solution.

4. A method for producing an optical material, which comprises polymerizing and curing the polymerizable composition for optical materials according to claim 1.

5. An optical material obtained by the production method according to claim 4.

6. An optical lens comprising the optical material according to claim 5.

7. A method for producing a polymerizable composition for optical materials, according to claim 1, which comprises the steps of:

subjecting 10 to 50 parts by mass of the below-described compound (a) and 1 to 20 parts by mass of the below-described compound (c) to a prepolymerization reaction at a reaction temperature T1 (wherein T1 is 0 to 45° C.) in the presence of 50 to 90 parts by mass of the below-described compound (b) with the proviso that the total amount of the compound (a) and the compound (b) is 100 parts by mass, using 0.001 to 5 parts by mass of the below-described compound (d) as a prepolymerization catalyst, to obtain a preliminary reaction solution; and adding a polymerization catalyst to the preliminary reaction solution with the temperature being set at T2 with the proviso that T2 is T1-15° C. to T1+10° C. and 0 to 45° C.:

(a) sulfur (the compound (a));

(b) a compound having two intramolecular episulfide groups represented by the following formula (1) (the compound (b)):

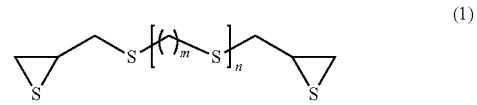
(1)

wherein m represents an integer from 0 to 4, and n represents an integer from 0 to 1;
- (c) a compound having one or more SH groups (the compound (c));
- (d) a compound represented by the following formula (2) (the compound (d)):

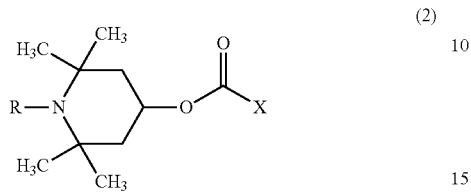

wherein R represents an alkyl group having 1 to 4 carbon atoms, and X represents an organic group having 2 to 11 carbon atoms, which has any of a vinyl group, a vinylidene group and a vinylene group.

8. A method for producing an optical material, which comprises polymerizing the polymerizable composition for optical materials produced by the production method according to claim 7 with the initial temperature of the polymerization being set at T3 with the proviso that T3 is T2-10° C. to T2+10° C. and 0 to 40° C.

9. An optical material produced by the method according to claim 8.

* * * * *